Jan. 24, 1939. J. EGGERT ET AL 2,144,649
PROCESS OF PRINTING LENTICULAR FILM AND LENTICULAR FILM THEREFOR
Filed May 8, 1936
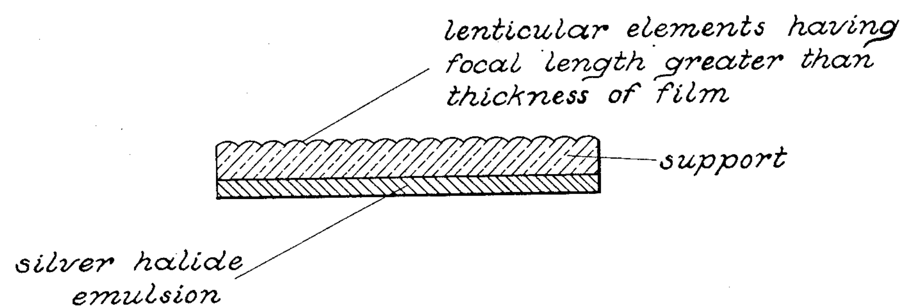
John Eggert
Gerd Heymer
INVENTORS
BY Hutz and Joslin
ATTORNEYS Patented Jan. 24, 1939

2,144,649

UNITED STATES PATENT OFFICE 2,144,649

PROCESS OF PRINTING LENTICULAR FILM AND LENTICULAR FILM THEREFOR

John Eggert, Leipzig-Gohlis, and Gerd Heymer, Wolfen Kreis Bitterfeld, Germany, assignors to I. G. Farbenindustrie Aktiengesellschaft, Frankfort-on-the-Main, Germany Application May 8, 1936, Serial No. 78,534
In Germany May 9, 1935

2 Claims. (Cl. 95—2)

Our present invention relates to a process of printing a lenticular film on another lenticular film.

One of its objects is to provide an improved process of printing a lenticular film on another lenticular film. Another object is an improved lenticular film for copying purposes. Further objects will be seen from the detailed specification following hereafter.

In printing a lenticular film on to another lenticular film there frequently occurs, as is well known, a certain streakiness in the print which arises owing to the superposition of the lenticular screen of the original film on that of the printing film. For avoiding this streakiness there have already been suggested numerous means which serve to influence the course of the rays between the original and the print. However, even when these hitherto known means are applied there is frequently still perceptible a streakiness, the cause of which cannot directly be determined.

Further investigation of the conditions giving rise to this streakiness have shown that there is a certain relationship between the appearance of the streakiness and the focal length of the lenticular elements of the film to be printed on. When the printing film has a normal focal length, that is to say when the focal length of the lenticular elements is equal to the distance between the surface of the elements and the photographic layer, streakiness is observed notwithstanding the application of known means for avoiding it. The streakiness is present in increased degree if there is used a printing film having a shorter focal length. On the contrary it is reduced or completely disappears if there is used a printing film with a greater focal length.

Accordingly the present invention consists of a process of printing a lenticular film on to another lenticular film, wherein the lenticular film to be printed on is one in which the focal length of the lenticular elements is greater than the distance of the surface of the elements from the sensitive layer. For this purpose there are most suitable films in which the focal length exceeds by 1–20 per cent the distance of the lenticular surface from the layer. The permissible extent by which the focal length may exceed the normal depends on the breadth of the elements and on the thickness of the film and may be greater the greater the ratio of the focal length to the aperture of a lenticular element. Too great a deviation from the normal focal length must be avoided in order that the color reproduction may not suffer.

The focal length of the lenticular elements may very easily be determined; for instance, the focal length of the lenticular elements is normal, that is to say equal to the thickness of the film, when an image of an object at a practically infinite distance is formed in the photographic layer.

The invention may be used with advantage both in projection printing and in printing by contact.

The invention which includes a lenticular film suitable for use in the process having lenticular elements whose focal length exceeds the distance of the lenticular surface on the photographic layer, preferably by 1–20 per cent is further illustrated by the accompanying self-explanatory drawing depicting a section through a film according to the present invention.

What we claim is:

1. In a process of printing a lenticular film on a light sensitive lenticular film the step which comprises printing on a light sensitive lenticular film provided with lenticular elements having a focal length about 1 to 20 per cent greater than the distance of the lenticulated surface from the light sensitive layer.

2. A lenticular film for copying purposes comprising a support bearing on one side a light sensitive layer and being provided on the other side with lenticular elements having a focal length about 1 to 20 per cent greater than the thickness of the film.

JOHN EGGERT.
GERD HEYMER.